(12) United States Patent
Nass (10) Patent No.: US 11,045,879 B2
(45) Date of Patent: Jun. 29, 2021

(54) TURNING MACHINE AND METHOD FOR TURNING WORKPIECES (71) Applicant: ENSINGER GmbH, Nufringen (DE)

(72) Inventor: Fred Nass, Bad Kötzting (DE)

(73) Assignee: ENSINGER GmbH ( * ) Notice: Subject to any disclaimer, the term of this patent is extended or adjusted under 35 U.S.C. 154(b) by 0 days.

(21) Appl. No.: 16/349,953

(22) PCT Filed: Nov. 21, 2017

(86) PCT No.: PCT/IB2017/057281
§ 371 (c)(1),
(2) Date: May 14, 2019

(87) PCT Pub. No.: WO2018/096444
PCT Pub. Date: May 31, 2018

(65) Prior Publication Data
US 2019/0314898 A1 Oct. 17, 2019

(30) Foreign Application Priority Data

Nov. 25, 2016 (DE) .......................... 102016122746.3

(51) Int. Cl.
B23B 13/04 (2006.01)
B23B 3/16 (2006.01)
B23B 3/32 (2006.01)

(52) U.S. Cl.
CPC .............. B23B 13/04 (2013.01); B23B 3/167 (2013.01); B23B 3/32 (2013.01)

(58) Field of Classification Search
CPC ............ B23B 13/04; B23B 3/167; B23B 3/32
See application file for complete search history.

(56) References Cited

U.S. PATENT DOCUMENTS 6,758,117 B2 * 7/2004 Baumann ............. B23Q 39/026
29/36

FOREIGN PATENT DOCUMENTS

| DE | 2951565 A1 | 7/1981 |
| EP | 0506209 A1 | 9/1992 |
| EP | 0155764 A1 | 11/2001 |
| EP | 1193027 A2 | 4/2002 |
| JP | S6186102 A | 5/1986 |
| JP | H02298403 A | 12/1990 |
| JP | S62282802 A | 12/1997 |
| WO | 2008098713 A1 | 8/2008 |

* cited by examiner

Primary Examiner — Alan Snyder
(74) Attorney, Agent, or Firm — Quarles & Brady LLP (57) ABSTRACT The present disclosure generally relates to a turning machine comprising a first spindle which can be set in rotation for gripping and rotating a first semi-finished product to be machined, in particular to be turned, and a second spindle which can be set in rotation and is likewise suitable for gripping and rotating a second semi-finished product to be machined. A first bar load magazine associated with the first spindle is configured to convey the first semi-finished product through a first opening of the first spindle into a machining area located between the spindles. A second bar load magazine associated with the second spindle may be configured to convey a second semi-finished product through a second opening of the second spindle into the machining area.

5 Claims, 3 Drawing Sheets

TURNING MACHINE AND METHOD FOR TURNING WORKPIECES

CROSS-REFERENCE TO RELATED PATENT APPLICATIONS

This application is a national stage entry of PCT International Application No. PCT/IB2017/057281, filed on Nov. 21, 2017, and claims priority to German Patent Application No. DE 102016122746.3 filed Nov. 25, 2016, the contents of these applications are hereby incorporated by reference as if set forth in their entirety herein.

FIELD OF THE INVENTION

The present invention relates to a turning machine, in particular a CNC turning machine, comprising a first spindle and a second spindle. The invention also relates to a method for turning workpieces in the aforementioned turning machine.

TECHNICAL BACKGROUND

Conventional turning machines for manufacturing precision parts, in addition to a main spindle with full function, also have a secondary spindle with limited function, i.e. the secondary spindle is generally not a full spindle with its own bar loader. Turning machines can also be equipped with one or more tool revolvers. These turning machines, however, machine just one piece per unit of time. This may result in the disadvantage that, when machining certain workpieces or semi-finished products, costly system components are not used efficiently or even at all, or machining must be performed in a number of steps, amongst other things also with a replacement of the processing machine. In particular, CNC turning machines with a main spindle and with a counter spindle are thus known, wherein, depending on how the CNC turning machine is equipped, a plurality of tool revolvers are situated in a machining area (currently, one to three tool revolvers is/are possible). Tool holders with machining tools are inserted into these tool revolvers, by means of which tool holders the workpieces are clamped in clamping devices (collets, three-jaw chucks or the like) of the main spindle and/or the secondary spindle.

The main spindle is generally situated on the left side of the CNC turning machine. The main spindle is internally hollow, and therefore a bar load magazine, which is then situated likewise on the left side of the machine, can be used to introduce bar material for machining into the machining area. The bar material is generally clamped by a collet of the first spindle, and a first side of the bar material is then machined with rotation of the first spindle. When the first side of the fed bar material has been machined to a finished state, the bar material can be automatically taken over by the counter spindle and clamped in a clamping device of the secondary spindle. If, however, the diameter of the material to be machined is greater than a "clear width" of the main spindle, these parts must be inserted by hand or by means of a robot into the clamping device of the main spindle and/or the secondary spindle. The finished parts in this case must be removed again by hand or by means of a robot. Following the takeover and clamping, a turned part can be cut off from the fed bar material by a cutting chisel, and then a second side of the turned part can be further machined or finished with rotation of the second spindle. The finished turned parts are generally transported away from the machining area of the CNC turning machine by means of a small conveyor belt.

The object of the present invention is to provide a turning machine and a method of the kind described in the introduction which enable a particularly efficient machining of workpieces or semi-finished products.

SUMMARY OF THE INVENTION

The object is achieved by the subjects of the independent claims. Advantageous embodiments are part of the dependent claims, the following description, and the drawings.

In accordance with a first aspect of the invention a turning machine is provided, in particular a CNC turning machine or an NC turning machine. The turning machine comprises a first spindle, which can be set in rotation for clamping and rotating a first semi-finished product to be turned, and a second spindle, which is opposite the first spindle and can be set in rotation for clamping and rotating a second semi-finished product to be turned. The first spindle is associated with a first bar load magazine or a first bar feed, which is configured to convey the first semi-finished product through a first opening of the first spindle into a machining area situated between the spindles. The second spindle is now associated with a second bar load magazine or a second bar feed, which is configured to convey the second semi-finished product through a second opening of the second spindle into the machining area. The first spindle and the second spindle preferably can be set in rotation about a common axis of rotation. Furthermore, at least one of the two spindles is preferably movable along the common axis of rotation, whereby the distance between the spindles can be varied.

Here, the bar load magazines or bar feeds are devices by means of which semi-finished products in the form of bar material in various shapes (for example round, quadrangular or hexagonal material) can be fed manually or preferably fully automatically to the turning machine, in particular the CNC turning machine, or spindles thereof via the openings of the spindles. In this context, the term "associated" can be understood in particular to mean that the first bar load magazine is situated on the same side as the first spindle, wherein a discharge opening of the first bar load magazine is connected to the opening of the first spindle, and the second bar load magazine is situated on the same side as the second spindle, wherein a discharge opening of the second bar load magazine is connected to the opening of the second spindle. The machining tools can be arranged in particular on tool revolvers of the turning machine, which for example can be turned and displaced within the machining area.

The two spindles can in particular have the same functionalities, dimensions and/or the same outputs. The turning machine according to the invention thus comprises, instead of a "limited" counter spindle (with lower output and reduced functionality compared to the main spindle), a full second ("main") spindle, with a second bar load magazine situated on the same side as said second spindle. In other words, a full main spindle is provided instead of a secondary spindle known from the prior art, and the turning machine can be used more economically and in a more versatile manner on account of the provision of the second bar load magazine.

The turning machine according to the invention can thus be used in particular for production at the same time, or rather simultaneously of two single turned parts, wherein each of the single turned parts can be clamped on one of the spindles, set in rotation thereby, and can be machined by turning by means of a machining tool within the machining area. It is thus possible for the single turned parts to be manufactured at the same time, whereby the number of workpieces manufactured per unit of time can be increased, in particular doubled, and the turning machine can be used particularly efficiently. The two single turned parts can be identical or different turned parts. The turning machine according to the invention consequently enables an improved degree of utilisation, for example with regard to the measurand "workpiece per footprint" or "workpiece per machine".

The turning machine according to the invention is also suitable for the simultaneous production of complex turned parts, wherein a first complex turned part can be clamped successively on both spindles and/or rotatable pickup devices, set in rotation thereby, and machined by turning by means of machining tools within the machining area. At the same time, a second complex turned part can also be clamped successively on the other of the spindles and/or available rotatable pickup devices, set in rotation thereby, and machined by turning by means of machining tools within the machining area. In this practical example it is also possible for the complex turned parts to be manufactured at the same time, whereby the number of workpieces manufactured per unit of time can be increased and the turning machine can be used particularly efficiently. The two complex turned parts can be identical or different turned parts.

In accordance with an embodiment, the first spindle and the second spindle are identical parts and are arranged symmetrically with respect to one another, whereby the design of the turning machine can be simplified.

Furthermore, the turning machine can comprise at least one robot, which is configured to displace or to transfer at least parts of the first semi-finished product from the region of the first spindle into the second spindle and/or to displace or to transfer at least parts of the second semi-finished product from the region of the second spindle into the first spindle. In particular, the robot can remove the semi-finished products from the corresponding regions of their spindles, once in each case a starting region of the semi-finished products has been machined beforehand and cut off by means of a cutting chisel. The removal can also be implemented by a pickup system and the tool revolver, which in many cases can be performed more quickly than by a robot. In this case, the starting region of the semi-finished product is also separated off by a cutting chisel of a free further tool revolver. As a result of the cutting process, the cut-off, previously machined part of the semi-finished product is no longer in the first spindle, but in the immediate surroundings thereof and therefore "in the region" of the spindle in question. Nevertheless, the robot can also be configured to displace the semi-finished products directly from the first spindle into the second spindle, and vice versa. The robot can be configured to be rotated and displaced three-dimensionally within the machining area, wherein these movements can be performed in particular fully automatically.

The robot can in particular convey the first semi-finished product into the second spindle and the second semi-finished product into the first spindle in such a way that in each case an as yet un-machined end region of the semi-finished products protrudes into the machining area and is available for machining by turning. As a result of the use of the robot, a starting region and an end region of the workpieces remote from the starting region can thus in each case be arranged and machined alternately within the two spindles. In particular, two robots can be provided, wherein a first robot is configured to displace the first semi-finished product from the region of the first spindle into the second spindle, and a second robot is configured to displace the second semi-finished product from the region of the second spindle into the first spindle. As a result of the use of the two robots, it is possible to machine the two sides of the semi-finished products or workpieces facing away from one another at the same time or at least with a time overlap. A particularly efficient exchange of workpieces from the first spindle into the second spindle and vice versa can thus be performed by means of a robot and at least one movable spindle as described beforehand. Furthermore, the first and/or the second spindle can be configured to be moved in a horizontal and in a vertical direction, such that the first and/or the second spindle can move in the direction of the other spindle and can remove a previously machined semi-finished product from that spindle, even without the aid of a robot.

In accordance with a further embodiment, at least one tool revolver for receiving at least one tool for machining the first semi-finished product to be machined and/or the second semi-finished product to be machined or partially finished workpieces is arranged within the machining area, wherein the at least one tool revolver has a third spindle which can be set in rotation (in the sense of the above-mentioned pickup device) for receiving and rotating the first semi-finished product to be machined or the second semi-finished product to be machined. It is possible to machine an additional semi-finished product or to further machine the previous semi-finished products by means of the third spindle. Furthermore, in accordance with an alternative configuration of the turning machine according to the invention, the tool revolver in accordance with the previously described embodiments can also replace the first of the second spindle by means of its third spindle, wherein, amongst other things, the machining area is then situated between the first/second spindle and the third spindle and one of the bar load magazines can be associated with the third spindle and can be configured to convey a semi-finished product through the opening of the third spindle into the machining area.

Furthermore, four tool revolvers can be arranged within the machining area, wherein two tool revolvers each have a spindle that can be set in rotation (pickup devices), which are configured to each simultaneously receive and rotate one of the semi-finished products to be machined, wherein the other two tool revolvers are configured to simultaneously machine the simultaneously rotating semi-finished product. In other words, two tool revolvers have a spindle and two tool revolvers may have no spindle. Tool revolvers with rotatable pickup device thus correspond to one of the above-mentioned third spindles. This embodiment makes it possible for the semi-finished products to be removed from their spindles once in each case a starting region of the semi-finished products has been machined beforehand. The semi-finished products can then be introduced one into each of the spindles of the tool revolvers, clamped there and set in rotation, so as to machine in each case, once the already machined starting region has been cut off, an as yet un-machined end region of the semi-finished products by a tool which is arranged on a tool revolver without spindle. During a machining of this kind of the first and second semi-finished product, further semi-finished products can already be conveyed into the first and the second spindle by the two bar load magazines, whereby the production efficiency can be increased further.

In this regard, a provided robot—possibly with at least one spindle movable in the horizontal and vertical direction as described above—can be configured to displace the first semi-finished product from the region of the first spindle into one of the spindles of the tool revolvers and to displace the second semi-finished product from the region of the second spindle into the other of the spindles of the tool revolvers. The aforementioned displacement by means of the robot or by means of the robots can be performed, as described further above, in particular once the previously machined starting regions of the semi-finished products have been cut off.

Alternatively, the first bar load magazine can be configured to transfer the first semi-finished product from the first spindle into one of the spindles of the tool revolvers, wherein the second bar load magazine is configured to transfer the second semi-finished product from the second spindle into the other of the spindles of the tool revolvers. This transfer is then performed without the aid of a robot, and a semi-finished product is then generally received by the pickup device of a tool revolver.

In this regard it can be particularly advantageous if a clamping device or an insertion opening for semi-finished products of the clamping device of the corresponding spindles of the tool revolver is situated in each case in a feed direction of the bar load magazine, which in particular can be made possible by a rotation and/or displacement of the two tool revolvers with the spindles. In accordance with this embodiment, the previously machined starting regions of the semi-finished products can be cut off in particular following the displacement of the semi-finished products by means of the bar load magazines into the spindles or pickup devices of the tool revolvers, when the semi-finished products have been clamped in the spindles of the tool revolvers and have been set in rotation. A displacement of the semi-finished products by hand or by robot can be spared in accordance with this embodiment, whereby the production process of the workpieces can be further automated and simplified, and production costs of the turning machine can be reduced by dispensing with costly robotics.

The above-described turning machine, in particular by the second ("main") spindle and the second bar load magazine, particularly preferably in coordination with an intelligent control unit of a CNC turning machine, enables a new functioning of tools in the production of precision parts, whereby the economic viability can be significantly increased. The production efficiency can thus be significantly increased, which in particular can be reflected positively on fixed and variable production cost components of a product.

In accordance with a second aspect of the invention, a method for producing a partially machined first workpiece and a partially machined second workpiece by turning of a first semi-finished product and turning of a second semi-finished product in a turning machine is therefore provided. The method starts with the provision of a turning machine, preferably a CNC turning machine, described beforehand in conjunction with the first aspect of the invention.

The first workpiece machined merely on one side, and therefore partially, is produced by means of the steps of conveying the first semi-finished product through the first opening of the first spindle of the turning machine into the machining area situated between the spindles, clamping the first semi-finished product in the first spindle, setting the first semi-finished product in rotation by means of the first spindle, and rotating a starting region of the first semi-finished product by means of a first machining tool of the turning machine within the machining area.

The second workpiece, likewise machined merely on one side, and therefore partially, is produced by means of the steps of conveying the second semi-finished product through the second opening of the second spindle of the turning machine into the machining area, clamping the second semi-finished product in the second spindle, setting the second semi-finished product in rotation by means of the second spindle, and rotating a starting region of the second semi-finished product by means of a second machining tool of the turning machine within the machining area, wherein the first partially machined workpiece and the second partially machined workpiece are produced at the same time.

As result of the above-described turning, the first and second partially machined workpiece are produced from the fed first and second semi-finished product respectively. By means of the method according to the second aspect of the invention, both two identical workpieces and two different partially machined workpieces can be produced at the same time, or rather simultaneously.

In accordance with an embodiment of the method according to the second aspect of the invention, an above-described turning machine with four tool revolvers is provided. A possible implementation of this embodiment of the method is explained in greater detail in conjunction with FIG. 2.

In accordance with this embodiment, a production of a finished first workpiece machined from the above-described partially machined first workpiece further comprises the following steps: the clamping of the first semi-finished product in the first spindle is released following the turning of the first semi-finished product, the previously machined starting region of the first semi-finished product is clamped in one of the spindles of the tool revolver, and the partially machined first workpiece is separated from the first semi-finished product. The partially machined first workpiece is then set in rotation by means of the spindle, in which it is now clamped, and the as yet un-machined starting region of the partially machined first workpiece is rotated by means of one of the machining tools of the tool revolver within the machining area.

In other words, the previously partially machined first workpiece is transferred from the first spindle into the spindle (pickup device) of one of the tool revolvers. This can be implemented by moving the pickup device firstly into a pickup position, in which the previously machined starting region of the first semi-finished product could be clamped in the pickup device, although in this case this has not yet actually happened for the time being. Instead, the rotational speed of the pickup device is firstly synchronised with the rotational speed of the first spindle, which is still rotating. Only after this synchronisation does the pickup device engage the previously machined starting region of the first semi-finished product. The first semi-finished product is thus clamped with the partially machined first workpiece both in the first spindle and in the pickup device, which rotate at the same rotational speed. The partially machined first workpiece can now be separated from the first semi-finished product, and the clamping in the first spindle released. The partially machined first workpiece separated from the first semi-finished product is thus only still clamped in the pickup device. Since the pickup device is already rotating, the partially machined first workpiece is also already set in rotation and can be turned by means of a tool of the tool revolver.

In accordance with the embodiment of the method the following steps are also comprised in the production of a finished second workpiece machined from the above-described partially machined second workpiece in accordance with the second aspect of the invention: the clamping of the second semi-finished product in the second spindle is released following the turning of the second semi-finished product, the previously machined starting region of the second semi-finished product is clamped in the other spindle of the tool revolver, and the partially machined second workpiece is separated from the second semi-finished product. The partially machined second workpiece is then set in rotation by means of the spindle, in which it is now clamped, and the as yet un-machined starting region of the partially machined second workpiece is turned by means of a further of the machining tools of the tool revolver within the machining area. The transfer of the previously partially machined second workpiece from the second spindle into the other spindle (pickup device) of the tool revolver can be performed similarly to the method described in conjunction with the partially machined first workpiece.

The release of the clamping of the semi-finished products can include a cutting off by means of a cutting chisel. The semi-finished products machined on one side can be transported to the corresponding spindle for example by hand or by means of a robot, as described in conjunction with the first aspect of the invention.

This embodiment thus provides that the semi-finished products, following machining of their first starting region and for machining of their second starting region, are not displaced into the opposite spindle, but instead into one of the spindles of the tool revolvers (pickup devices). In accordance with this embodiment, a turning machine is therefore provided in which the four revolvers are arranged within the machining area, wherein two tool revolvers each have a spindle that can be set in rotation, which spindles are configured to each receive and rotate at the same time one of the semi-finished products to be machined, wherein the other two tool revolvers are configured to machine at the same time the semi-finished products rotating at the same time. A robot can also be configured to displace the first semi-finished product from the region of the first spindle into one of the spindles of the tool revolvers and to displace the second semi-finished product from the region of the second spindle into the other of the spindles of the tool revolvers. In addition, the first bar load magazine can be configured to displace the first semi-finished product from the first spindle into one of the spindles of the tool revolvers, wherein the second bar load magazine is configured to displace the second semi-finished product from the second spindle into the other of the spindles of the tool revolvers.

In accordance with a third aspect of the invention a method for producing a workpiece by mining a semi-finished product in a turning machine is provided. An exemplary embodiment of the method is explained in greater detail in conjunction with FIG. 3.

The method comprises the following method steps: A turning machine in accordance with the first aspect of the invention is provided. A partially machined workpiece is firstly produced by machining a starting region of a first end face of the semi-finished product, wherein the following steps are carried out: the semi-finished product is conveyed through the first opening of the first spindle of the turning machine into the machining area situated between the spindles and is clamped in the first spindle. The semi-finished product is set in rotation by means of the first spindle, and the starting region of the semi-finished product is turned by means of a first machining tool of the tinning machine within the machining area. A partially machined workpiece is thus created from the semi-finished product.

A finished machined workpiece is then produced from the partially machined workpiece in that the turned starting region of the semi-finished product is gripped by means of the second spindle. The partially machined workpiece is separated from the semi-finished product, and an end region of the partially machined workpiece remote from the starting region is machined by means of the following steps: the partially machined workpiece is clamped in the second spindle and the partially machined workpiece is set in rotation by means of the second spindle. The end region of the partially machined workpiece is also turned by means of a second machining tool of the turning machine within the machining area, whereby the partially machined workpiece is formed into the finished machined workpiece. The finished machine workpiece is then ejected from the second spindle.

In other words, the workpiece partially machined beforehand is transferred from the first spindle into the second spindle. This can be implemented by firstly moving the second spindle into a pickup position, in which the previously machined starting region of the semi-finished product could be clamped in the second spindle, which in this case has not yet actually happened for the time being. Instead, the rotational speed of the second spindle is synchronised with the rotational speed of the first spindle, which is still rotating. Only after this synchronisation does the second spindle engage the previously machined starting region of the semi-finished product. The semi-finished product is thus clamped with the partially machined workpiece both in the first spindle and in the second spindle, which rotate at the same rotational speed. The partially machined workpiece can now be separated from the semi-finished product, and the clamping in the first spindle released. The partially machined workpiece separated from the semi-finished product is thus still clamped only in the second spindle. Since the second spindle is already rotating, the partially machined workpiece is also already set in rotation and can be turned by means of a tool of the tool revolver.

An embodiment of the method according to the third aspect of the invention also comprises the following steps: an as yet un-machined semi-finished product is advanced into the machining area once the partially machined workpiece has been separated from the semi-finished product and whilst the end region of the partially machined workpiece is being machined. The method steps according to the method in accordance with the third aspect of the invention are then run through again from the method step in which the partially machined workpiece is produced by machining of a starting region of a first end face of the advanced semi-finished product.

BRIEF DESCRIPTION OF THE DRAWINGS

Exemplary embodiments of the invention will be explained in greater detail hereinafter with reference to the schematic drawing, in which.

DETAILED DESCRIPTION OF EXEMPLARY EMBODIMENTS

Figure 1:
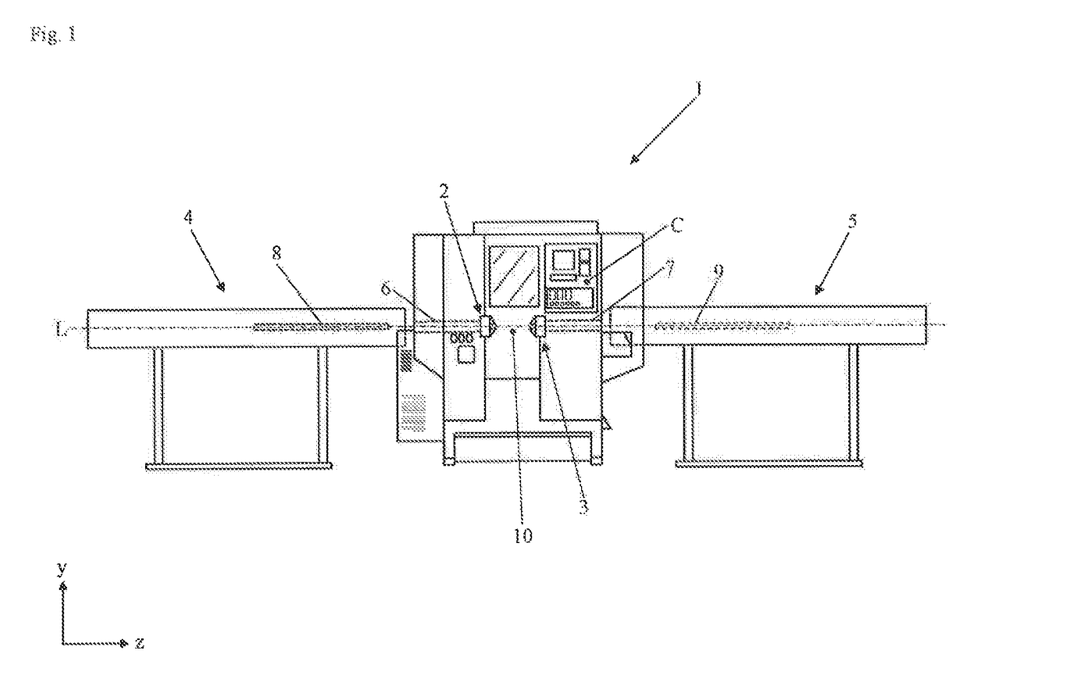
FIG. 1 is a front view of an exemplary embodiment of a CNC turning machine according to the invention.

FIG. 1 shows a CNC turning machine 1 with a first spindle 2 shown on the left in FIG. 1 and a second spindle 3 shown on the right in FIG. 1. The first spindle 2 is associated with a first bar load magazine 4, and the second spindle 3 is associated with a second bar load magazine 5. The functions and workflows of the CNC turning machine described hereinafter—unless stated otherwise—can be pre-programmed and can be performed in a fully automated manner, for which purpose the CNC turning machine 1 in particular has a control and operating unit C. The CNC turning machine 1 can also comprise means (not shown) for removing chips, wherein the chips preferably are removed to the rear or to the front.

Figure 2:
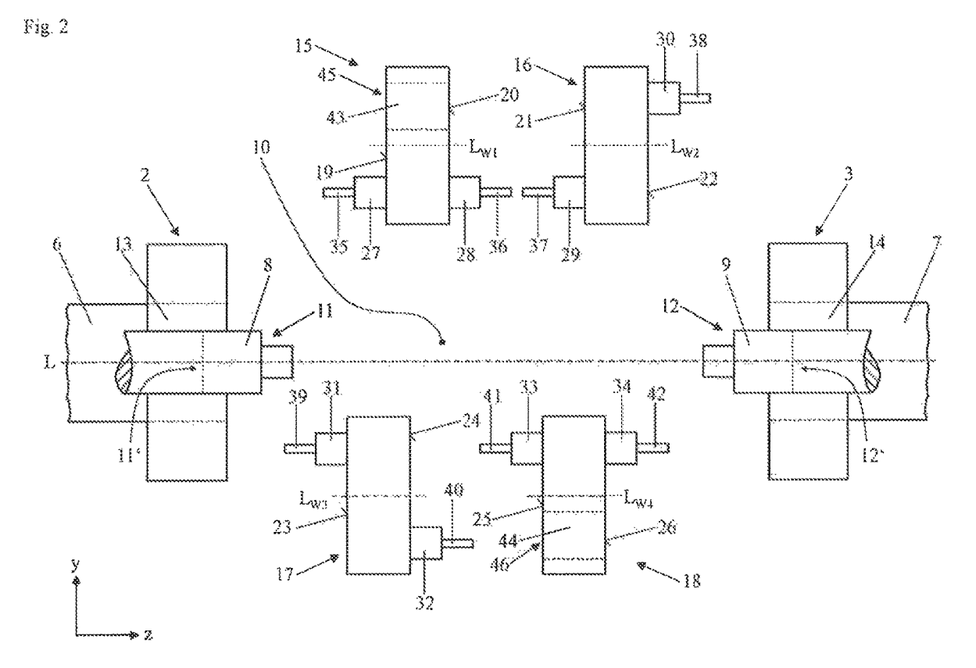
FIG. 2 is a front view of spindles and tool revolvers for the CNC turning machine according to FIG. 1 for operation in an operating mode in which two semi-finished products are turned at the same time.

The first spindle 2 and the second spindle 3 preferably lie on a common virtual longitudinal axis L and can be set in rotation by drive units (not shown), such that semi-finished products 8 and 9 (indicated in each case by a dashed line in FIG. 1) clamped therein can likewise rotate and be machined by means of machining tools (FIG. 2). Furthermore, the spindles 2 and 3 each have an opening 6 and 7 (likewise indicated in each case by a dashed line in FIG. 1), via which the semi-finished products 8 and 9 situated in the first bar load magazine 4 and the second bar load magazine 5 can be conveyed into a machining area 10 of the CNC turning machine 1, wherein the machining area 10 is situated between the first spindle 2 and the second spindle 3.

As can be seen from FIG. 2, a starting region 11 and 12 of the bar-shaped semi-finished products 8 and 9 respectively is situated in each case within the machining area 10. The semi-finished products 8 and 9 were previously introduced via the openings 6 and 7 into clamping devices 13 and 14 (for example collets or a three-jaw chuck), surrounding the semi-finished products 8 and 9, of the spindles 2 and 3 and fixed in the position shown by FIG. 2 by means of the clamping devices 13 and 14. Furthermore, a plurality of tool revolvers can be situated within the machining area 10. In the shown example a first tool revolver 15 shown in the upper left region in FIG. 2, a second tool revolver 16 shown in the upper right region in FIG. 2, a third tool revolver 17 shown in the lower left region in FIG. 2, and a fourth tool revolver 18 shown in the lower right region in FIG. 2 are provided.

The tool revolvers 15 to 18 can each be rotated about their virtual longitudinal axes $L_{W1}$, $L_{W2}$, $L_{W3}$ and $L_{W4}$ and can be displaced along their respective longitudinal axes $L_{W1}$, $L_{W2}$, $L_{W3}$ and transversely thereto. A tool holder 27 to 34 protrudes from end faces 19 to 26, facing away from one another, of the tool revolvers 15 to 18 and in each case receives a machining tool 35 to 42. By rotating and/or displacing the tool revolvers 15 to 18, the machining tools 35 to 42 can be brought into positions or locations in which they are in machining engagement with the semi-finished products 8 and 9 in order to produce a workpiece from the semi-finished products 8 and 9 by rotation of the semi-finished products. In the configuration shown by FIG. 2 the spindles 2 and 3 are identical parts, which are arranged opposite one another on the longitudinal axis L, symmetrically with respect to one another, i.e. point-symmetrically with respect to one another. The produced workpieces can be identical parts or different workpieces.

As shown by FIG. 2, a right starting region 11 of the first semi-finished product 8 shown on the left and a left starting region 12 of the second semi-finished product shown on the right can be turned first. To this end, the first semi-finished product 8 is clamped in the first clamping device 13 of the first spindle 2, and the first clamping device 13 is set in rotation, whereby the first semi-finished product 8 is likewise rotated, and the right starting region 11 of the first semi-finished product 8 is machined by turning by means of one of the machining tools 35 or 39 brought into position. Similarly, the second semi-finished product 9 is clamped in the second clamping device 14 of the second spindle 3, and the second clamping device 14 is set in rotation, whereby the second semi-finished product 9 is likewise rotated, and the left starting region 12 of the second semi-finished product 9 is machined by turning by means of one of the machining tools 38 or 42 brought into position.

If the spindles 2 and 3 are configured to be movable in a vertical direction y transversely to the longitudinal axis L, it is additionally possible to machine the starting region 11 of the semi-finished product 8 by the machining tools 37 and/or 41, which are arranged on the second tool revolver 16 and on the fourth tool revolver 18 respectively. In this case, it is also possible to machine the starting region 12 of the semi-finished product 9 by the machining tools 36 and/or 40, which are arranged on the first tool revolver 15 and on the second tool revolver 17 respectively. Following the machining of the semi-finished products 8, 9, the machined workpieces can be separated from the semi-finished products 8 and 9 and ejected from the turning machine 1. In this machining mode, identical or also different parts can be produced in parallel.

In order to provide a further operating mode, the first tool revolver 15 and the fourth tool revolver 18 additionally each contain a further clamping device 43 and 44 respectively, in which the partially finished workpieces provided from the machining of the semi-finished products 8 and 9 can be introduced and clamped. A first further clamping device 43 of the first tool revolver 15 shown in the upper left region in FIG. 2 forms part of a first further spindle (pickup device) 45 that can be set in rotation, and a second further clamping device 44 of the fourth tool revolver 18 shown in the lower right region in FIG. 2 forms part of a second further spindle (pickup device) 46 that can be set in rotation. The further clamping devices 43 and 44 can be set in rotation by means of drive devices (not shown), such that partially machined workpieces clamped in the further clamping devices 43 and/or 44 can likewise rotate and can be machined by means of machining tools of the free tool revolvers 16 and 17. On account of the lower output of the additional spindles (pickup devices) 45 and 46 in the tool revolvers 15 and 18, only limited, simple machining operations can be carried out. Here, only the cut side of the workpiece is preferably machined, in order to erase cutting traces.

For example, the right starting region 11 of the first semi-finished product 8 shown on the left in FIG. 2 is firstly machined by means of the machining tool 35 of the first tool revolver 15. Similarly, at the same time, the left starting region 12 of the second semi-finished product 9 shown on the right in FIG. 2 can be machined by means of the machining tool 42 of the fourth tool revolver 18. Once the starting regions 11 and 12, arranged opposite one another, of the semi-finished products 8 and 9 have been machined as intended, the further clamping devices 43 and 44 are brought into an open position, so that the right starting region 11 of the first semi-finished product 8 can be displaced into the clamping device 43 of the first tool revolver 15, and the left starting region 12 of the second semi-finished product 9 can be displaced into the clamping device 44 of the first tool revolver 18.

Once the starting regions 11 and 12 have been clamped in the further clamping devices 43 and 44 respectively, wherein the partially finished workpiece is still fixedly attached to the starting pieces of the semi-finished products 8 and 9, the partially finished workpieces are separated from the semi-finished products 8 and 9, for example by cutting systems on the tool revolvers 17 and 16. The tool revolvers 15 to 18 can now be moved and/or displaced in such a way that the partially machined workpieces can be machined to a finish in the corresponding clamping device 44 or 43 of the tool revolvers 15 and 18 respectively, by tools of the revolvers 16 and 17.

In particular, the first tool revolver 15 can be rotated and/or displaced for example in such a way that the longitudinal axis L of the spindles 2 and 3 runs preferably centrally through the opened first further clamping device 43 of the first tool revolver 15. The fourth tool revolver 18, which is in the position shown by FIG. 2, can also be brought by rotation and/or displacement into a position in which the centre of the clamping device 44 may also lie on the longitudinal axis L. The positions of the tool revolvers 15 to 18 and of the tools 35 to 42 are preferably controlled here by sensor-based monitoring or by programming, such that a mutual collision of the tool revolvers 15 to 18, of the tools 35 to 42, semi-finished products 8 and 9, partially finished workpieces, etc. is ruled out.

Alternatively, the bar load magazines 4 and 5 can also be used in order to displace the semi-finished products 8 and 9 from the respective clamping devices 13 and 14 of the spindles 2 and 3 in the longitudinal direction L of the spindles 2 and 3 into the second further clamping device 44 (first semi-finished product 8) and into the first further clamping device (second semi-finished product 9). To this end, the tool revolvers 15 to 18 can be rotated and/or displaced as described beforehand in conjunction with the displacement of the semi-finished products 8 and 9 by hand or by means of a robot. As soon as the semi-finished products 8 and 9 are clamped within the further clamping devices 43 and 44 respectively, the semi-finished products 8 and 9 are likewise set in rotation by rotation of the further clamping devices 43 and 44. Now, the starting regions 11 and 12 firstly can be cut off from the rest of the corresponding semi-finished product 8 or 9 by means of cutting chisels (not shown) and, once the cutting process is complete, the rotation of the further clamping devices 43 and 44 can be stopped, wherein the cutting chisels can be attached for example to the tool revolvers 17 or 16. Following the cutting process, the first tool revolver 15 and the fourth tool revolver 18 can be brought into a position that makes it possible to machine the ends of the cut semi-finished product portions by the available tool revolvers 17 and 16.

Figure 3:
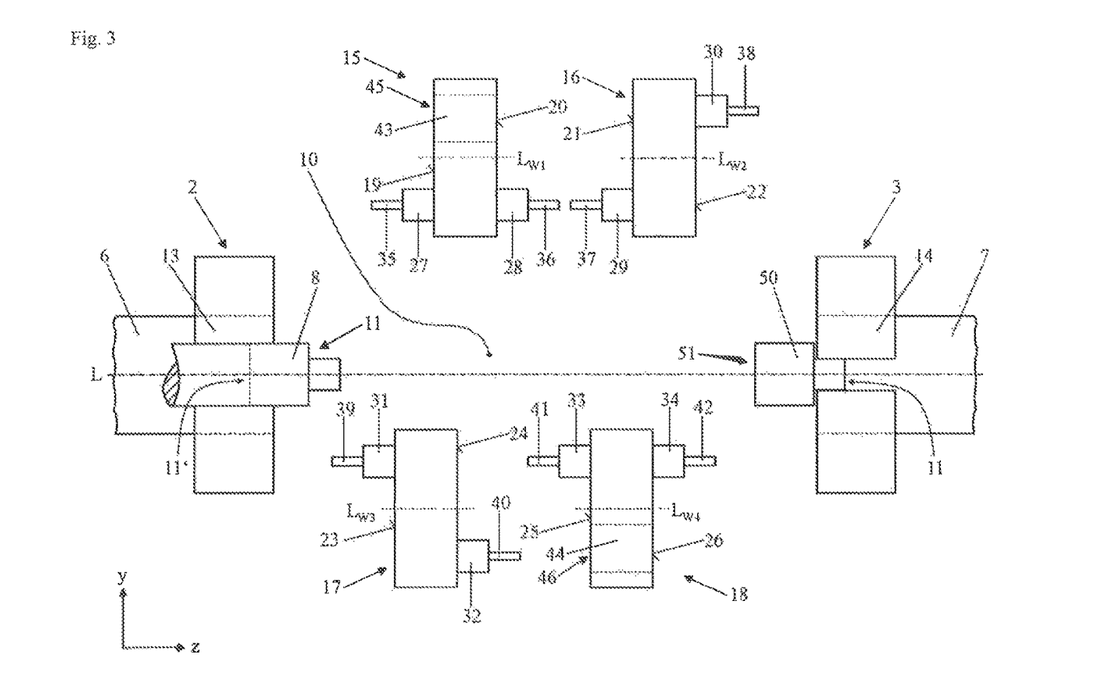
FIG. 3 is a front view of spindles and tool revolvers for the CNC turning machine according to FIG. 1 for operation in a further operating mode, in which a workpiece is firstly produced partially on one side in one of the spindles and is machined to a finish following transfer to the other spindle.

FIG. 3 shows a further operating mode. In this operating mode the turning machine 1 according to the invention according to FIG. 1 with the two spindles 2, 3 and four tool revolvers 15 to 18 according to FIG. 2 is loaded with just a single semi-finished product 8 in the first clamping device 13. The opposite second clamping device 14 remains empty initially. In this operating mode the starting region 11 of the semi-finished product 8 is machined in part by the tools 35, 39 and optionally 37 and 41. Once the starting region 11 has been machined as intended in this way, the rotation of the first clamping device 13 initially and thus also of the semi-finished product 8 now machined on one side at the end can be stopped.

Once the second spindle 3 has been moved along the longitudinal axis L to the left towards the first spindle 2 in a pickup position and in this pickup position has grasped the starting region 11 of the partially machined semi-finished product 8 by means of the second clamping device 14, the partially machined workpiece 50 is separated from the semi-finished product 8 by means of the first tool revolver 15 or the third tool revolver 17 and is thus transferred completely into the second clamping device 14 of the second spindle 3. The second spindle 3 can now be moved back into its end position shown on the extreme right in FIG. 3, in which an end region 51 of the partially machined workpiece 50 is rotated by available tools and the partially machined workpiece 50 is thus machined to a finish. In parallel, i.e. at the same time or at least with a time overlap, the clamping of the semi-finished product 8 within the first clamping devices 13 is released, in order to slide a new starting piece 11 of the semi-finished product 9 into the machining area 10.

The first semi-finished product 8 retains its orientation during the process, i.e. it is clamped in the first clamping device 13 of the first spindle 2 in such a way that the previously machined right starting region 11 now no longer existing in the first spindle, but in the second spindle 3, is replaced by a new starting region 11' of the semi-finished product 8 and is now situated again within the machining area 10 and can be machined by the machining tools 35, 39 and/or 37 and 41 (a delimitation of the new starting region 11' of the semi-finished product 8 is indicated in FIG. 3 by a dashed line). In this operating mode a workpiece can be machined in the turning machine in two stages, wherein the two stages preferably represent machining from two different sides.

The described removal and clamping can be performed for example by hand, by movement of the spindles and gripping by means of the spindles or by means of a robot configured for this purpose (not shown). The workpieces are separated from the semi-finished products generally by means of cutting chisels (not shown), which for example can be attached to the tool revolvers 15 to 18.

The invention claimed is:

1. A turning machine, comprising
a first spindle, which can be set in rotation for gripping and rotating a first semi-finished product to be turned, and
a second spindle, which is opposite the first spindle and can be set in rotation, for gripping and rotating a second semi-finished product to be turned,
wherein the first spindle is associated with a first bar load magazine, which is configured to convey the first semi-finished product through a first opening of the first spindle into a machining area located between the spindles, and
wherein the second spindle is associated with a second bar load magazine, which is configured to convey the second semi-finished product through a second opening of the second spindle into the machining area,
wherein at least one tool revolver is arranged within the machining area for receiving at least one tool for machining the first semi-finished product to be machined and/or the second semi-finished product to be machined, and wherein the at least one tool revolver has a third spindle, which can be set in rotation, for receiving and for rotating the first semi-finished product to be machined and/or the second semi-finished product to be machined,
wherein four tool revolvers are arranged within the machining area,
wherein two tool revolvers each have a spindle, which can be set in rotation and which are configured to each simultaneously receive and rotate one of the semi-finished products to be machined,
wherein the other two tool revolvers are configured to simultaneously machine the simultaneously rotating semi-finished product.

2. The turning machine according to claim 1, wherein the first spindle and the second spindle are identical parts and are arranged symmetrically with respect to one another.

3. The turning machine according to claim 1, wherein the machine further comprises at least one robot, and wherein the at least one robot is configured to displace at least parts of the first semi-finished product from the first spindle into the second spindle and/or to displace at least parts of the second semi-finished product from the second spindle into the first spindle.

4. The turning machine according to claim 1, wherein the first bar load magazine is configured to transfer the first semi-finished product from the first spindle into one of the spindles of the tool revolver, and wherein the second bar load magazine is configured to transfer the second semi-finished product from the second spindle into the other of the spindles of the tool revolver.

5. A method for producing a first partially machined workpiece and a second partially machined workpiece by turning a first semi-finished product and turning a second semi-finished product in a turning machine, the method including steps comprising:

providing a turning machine comprising:
  a first spindle, which can be set in rotation for gripping and rotating a first semi-finished product to be turned;
  a second spindle, which is opposite the first spindle and can be set in rotation, for gripping and rotating a second semi-finished product to be turned;
  wherein the first spindle is associated with a first bar load magazine, which is configured to convey the first semi-finished product through a first opening of the first spindle into a machining area located between the spindles;
  wherein the second spindle is associated with a second bar load magazine, which is configured to convey the second semi-finished product through a second opening of the second spindle into the machining area;

producing a first partially machined workpiece by:
  conveying the first semi-finished product through the first opening of the first spindle of the turning machine into the machining area situated between the spindles;
  gripping the first semi-finished product in the first spindle;
  setting the first semi-finished product in rotation by means of the first spindle;
  turning a starting region of the first semi-finished product by means of a first machining tool of the turning machine within the machining area;

producing the second partially machined workpiece by:
  conveying the second semi-finished product through the second opening of the second spindle of the turning machine into the machining area;
  gripping the second semi-finished product in the second spindle;
  setting the second semi-finished product in rotation by means of the second spindle and turning a starting region of the second semi-finished product by means of a second machining tool of the turning machine within the machining area;

wherein the first partially machined workpiece and the second partially machined workpiece are produced simultaneously;

wherein at least one tool revolver is arranged within the machining area for receiving at least one tool for machining the first semi-finished product to be machined and/or the second semi-finished product to be machined, and wherein the at least one tool revolver has a third spindle, which can be set in rotation, for receiving and for rotating the first semi-finished product to be machined and/or the second semi-finished product to be machined;

wherein four tool revolvers are arranged within the machining area;

wherein two tool revolvers each have a spindle, which can be set in rotation and which are configured to each simultaneously receive and rotate one of the semi-finished products to be machined;

wherein the other two tool revolvers are configured to simultaneously machine the simultaneously rotating semi-finished products;

wherein production of a finished first workpiece from the partially machined first workpiece also comprises:
  releasing the gripping of the first semi-finished product in the first spindle following the turning of the first semi-finished product;
  gripping the previously machined starting region of the first semi-finished product in one of the spindles of the tool revolver;
  separating the partially machined first workpiece from the first semi-finished product;
  setting the partially machined first workpiece in rotation by means of this spindle;
  turning an as yet un-machined starting region of the partially machined first workpiece by means of one of the machining tools of the tool revolver within the machining area;

wherein production of a finished second workpiece from the partially machined second workpiece also comprises:
  releasing the gripping of the second semi-finished product in the second spindle following the turning of the second semi-finished product;
  gripping the previously machined starting region of the second semi-finished product in the other spindle of the tool revolver;
  separating the partially machined second workpiece from the second semi-finished product;
  setting the partially processed second workpiece in rotation by means of this other spindle; and
  turning an as yet un-machined starting region of the partially machined second workpiece by means of a further of the machining tools of the tool revolver within the machining area.

* * * * *

UNITED STATES PATENT AND TRADEMARK OFFICE
CERTIFICATE OF CORRECTION

PATENT NO. : 11,045,879 B2
APPLICATION NO. : 16/349953
DATED : June 29, 2021
INVENTOR(S) : Fred Nass Page 1 of 1

It is certified that error appears in the above-identified patent and that said Letters Patent is hereby corrected as shown below:

In the Specification

Column 7, Line 47, "by mining a" should be --by turning a--.

Column 7, Line 62, "the tinning" should be --the turning--.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*